June 16, 1936.  C. W. STEVENS  2,044,647
HANGER FOR GAS METERS
Filed Sept. 23, 1932
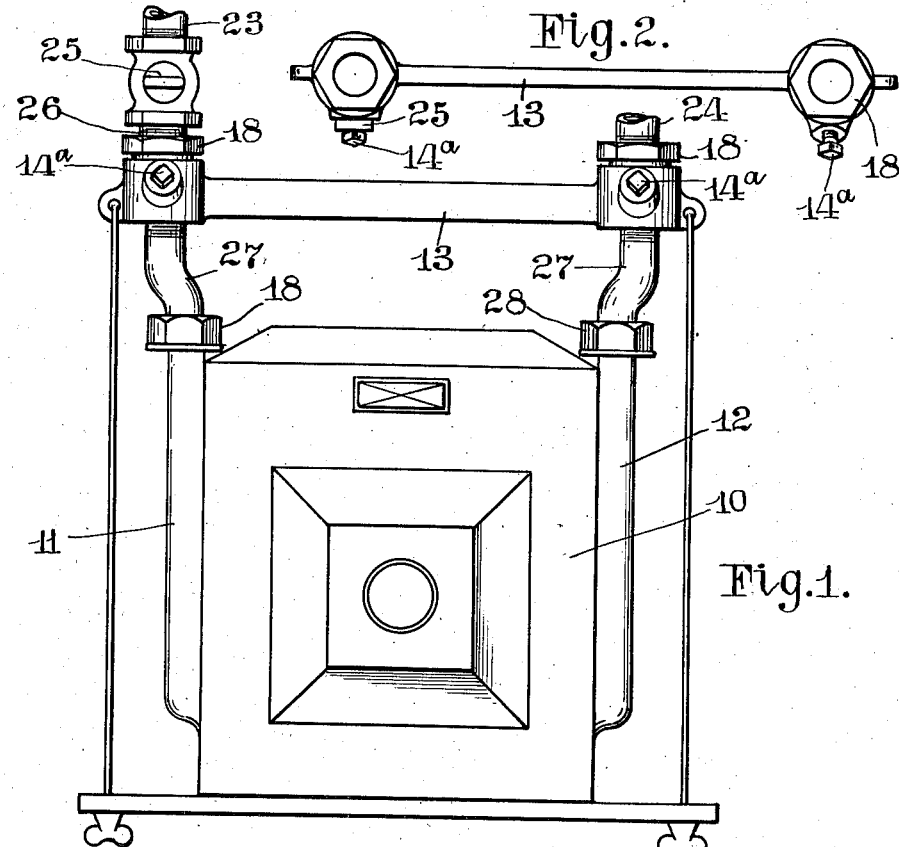
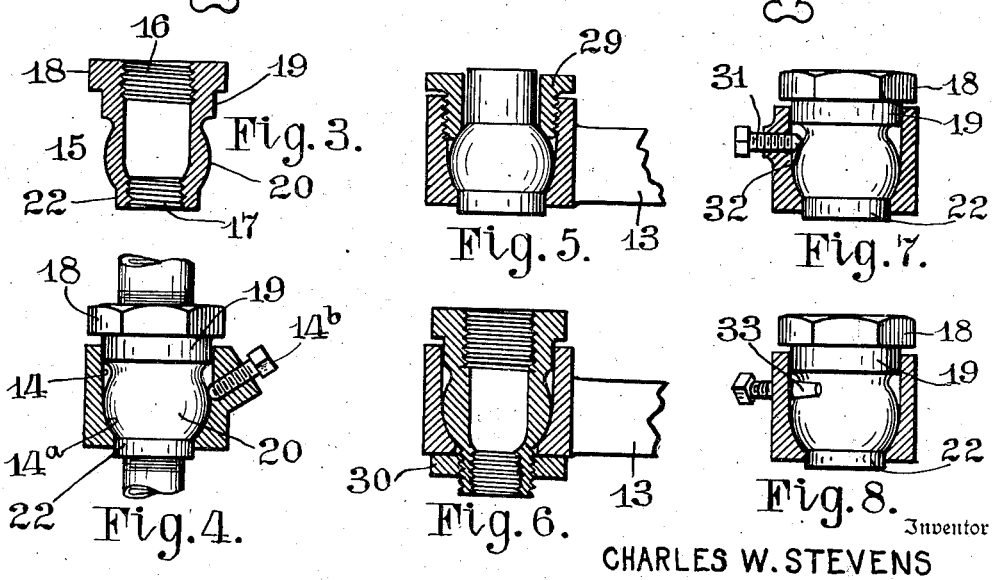
Inventor
CHARLES W. STEVENS Patented June 16, 1936

2,044,647

UNITED STATES PATENT OFFICE 2,044,647

HANGER FOR GAS METERS

Charles W. Stevens, Bexley, Ohio

Application September 23, 1932, Serial No. 634,488

5 Claims. (Cl. 285—3)

Gas meters are often made of sheet metal soldered together by hand and as a consequence are not uniform in the size and relative arrangement of their members. The terminals of the meter tubes—the inlet and outlet pipes—are not uniformly in horizontal planes or equally spaced. It has been said that no two meters are exactly alike. Moreover the terminals of the two service pipes to which the meter is to be connected are rarely left properly spaced by the plumber hence if the tubes of a meter were directly connected to the service pipes without holding means between the service pipes any strain imparted from the service pipes to the meter tubes would in time likely cause a rupturing of the meter and a resultant leaking of gas. Inventors have for a long time worked to provide devices for interposition between the service pipes and the meter tubes to relieve or obviate the imparting of strain from the service pipes to the meter tubes, and many patents have been issued for such devices. Among the latest of such patents is that of T. F. Noonan issued May 24, 1932, No. 1,860,263.

The principal object of the present invention is an improved and simplified construction of the type exhibited in said Noonan patent whereby the rotatable pipe coupling sleeve at the end of the rigid spacing bar is more easily manipulated and seated and more firmly secured. Other objects will appear from the disclosure herein.

The invention is embodied in the example herein shown and described, the feature of novelty being finally claimed.

In the accompanying drawing—

Figure 1 is a front elevation showing an ordinary house meter hung with my invention.

Fig. 2 is principally a top plane view of the service pipe connecting bar.

Fig. 3 is a central vertical section of one form of sleeve or pipe coupling according to the invention.

Fig. 4 is a view with the socket portion of the bar in section showing the sleeve of Fig. 2 engaged with the bar by means of a pressure screw.

Figs. 5, 6, 7, and 8 are views similar to Fig. 3 showing various modifications of means for pressing the sleeve downward onto its seat in the socket of the bar.

Referring first to Figs. 1 to 4 inclusive which show the preferred construction, the character 10 designates the sheet metal meter referred to, it having affixed thereto by solder, as usual, the inlet and outlet tubes 11 and 12, respectively.

The connector bar, designated 13, can be of any stiff material, preferably cast iron or steel. The opposite ends of said bar 13 are each provided with a socket 14 extending transverse the length of the bar, said socket being cylindrical at its upper portion but contracted at its lower end to form a shoulder 14ª. The upper portion of the wall of the bar forming the socket is shown as provided with a boss having a threaded opening slanting downward to the socket, said hole containing a pressing and pinching screw 14ᵇ.

Said sockets 14 are each designed to receive a sleeve or pipe coupling member 15 such as shown in Figs. 3—4. Said sleeve member 15 as shown in said views is each internally threaded at its upper and lower ends as indicated at 16 and 17 respectively. At its upper end the sleeve member is provided with a wrench receiving portion 18 and cylindrical portion 19 to fit in the upper end of the socket of the bar. Below said portion the sleeve portion at 20 is shown as made of spherical or spheroidal form with a terminal polar portion 22 extending through the lower and smaller opening of the socket.

The ends of the service pipes are indicated at 23 and 24, the pipe 23 being provided with a valve 25 for controlling the flow of or shutting off the gas to the meter. Said valve is connected with the screw thread of the upper end of the sleeve member by a short screw threaded portion at 26. The casing of the valve 25 can be made integral with the sleeve member, and the upper end of the valve casing provided with an internal thread for connection with the threaded end of the service pipe.

The construction of the modification shown in Fig. 5 is like that shown in Fig. 4, except that instead of using a set screw to hold the sleeve in its socket an externally threaded sleeve nut 29 threading into a screw thread in the upper end of the socket is employed.

In the construction of the modification shown in Fig. 6 a nut 30 threaded onto an externally threaded projection of the lower end of the sleeve is employed to draw the sleeve tightly down to its seat.

In Fig. 7 a horizontally extending set screw 31 in the bar having a conical end 32 to bear against the upper portion of the zonal surface is relied on to wedge or press the sleeve downward against its seat in the socket.

In Fig. 8 an effect similar to that had in the construction of Fig. 7 is obtained by means of a screw 33 having a long point acting with a wedging effect in a tangential direction on the upper surface of the zonal surface of the sleeve.

In practice with the constructions thus described the sleeve is first attached to the service pipe and then the bar elevated to place the sleeve into the socket of the bar, the service pipe being adjusted to permit this. Then the screw 14ª is turned to press against the upper portion of the zonal spherical portion of the sleeve. Such pressure being generally downward causes a slight lifting of the bar to fetch the lower zonal portion of the spherical portion into tight frictional or locking engagement with the shoulder at the bottom of the socket and therefore to lock the sleeve from rotation in the socket.

It is obvious that where a sleeve member like those shown is provided for each end of the bar the sleeve members can be first turned onto the service pipes and the bar afterwards shifted toward the sleeve members on the service pipe to effect the entrance and primary seating of the sleeve members in the sockets.

With a rigid or one piece bar and the sleeves the service pipes are thus definitely spaced and firmly held in relation to each other.

To connect the meter tubes with the sleeves or couplings there are provided short bent pipes or coupling nipples 27 provided at their upper ends with screw threads to engage the lower ends of the sleeves and including at their lower ends ordinary loose unions 28 for connection with the meter tubes. As these coupling nipples 27 are bent members, having offset lower portions, they can be turned in the sleeves to accommodate a wide range of variation in the spacing of the meter tubes; and because the ordinary unions are loose and provided with washers variations in the horizontality of the upper ends of the meter tubes can be compensated for.

It is to be understood, of course, that the bar can be provided at one end only with a sleeve of the construction herein shown for connecting one service pipe with the meter and the other end of the bar provided with any other suitable means for establishing communication between a service pipe and the meter.

The forms of the several parts can be changed without departing from the gist of the invention as claimed.

What I claim is:

1. In a meter connection, the combination of a rigid bar adapted to extend substantially horizontally and provided at the ends thereof with transverse sockets each contracted at its lower end to form a stop and each of said sockets forming a one piece bearing extending transversely therethrough, a pair of sleeve members shaped to fit in said sockets, the lower contracted end thereof limiting the upward movement of said bar onto said sleeve members and said sleeve members provided with screw threads whereby they may be connected to the ends of a pair of gas pipes and the bar connected therewith by shifting the bar towards the gas pipes, means for holding said members against axial displacement with respect to the bar after insertion into the sockets, and coupling nipples connected to and depending from the sleeve members and provided with means at the lower ends thereof for connection to the tubes of the meter.

2. A connection for holding in spaced relation the two service pipes of a gas meter provided with two tubes, said connection comprising in combination a rigid bar adapted to extend substantially horizontally and provided at the end thereof with vertical sockets extending therethrough, said sockets each contracted at its lower end to form a stop, a pair of vertical sleeve members each provided at its upper end with a screw thread whereby they may be connected to the lower ends of said service pipes, said sleeve member shaped to fit in a fixed substantially vertical position in said sockets and being insertable into the sockets while in connected relation with the service pipes by shifting the bar upwardly toward said service pipes and sleeve members, means for holding said bar against vertical displacement with respect to the sleeve members after application to said sleeve members, and coupling nipples connected to and depending from the sleeve members and provided with means for connection with the tubes of the meter.

3. Means for spacing the service pipes of a meter and communicatingly connecting the service pipes with the pipes of the meter comprising a rigid one-piece bar having at one end thereof, means for engaging one of the service pipes and having at the other end a transverse opening forming a bearing extending therethrough, said opening contracted at its lower end to form a stop, a sleeve to fit in said bearing, a screw thread in said sleeve for connection with the other service pipe whereby the sleeve may be first connected with said service pipe, and said bearing of the bar subsequently applied thereto by upward movement thereon, said stop limiting the movement of the bar onto said sleeve, and means engaged with the bar and sleeve for preventing transverse movement of said bar on said sleeve.

4. In a meter connection, the combination of a rigid one-piece service pipe spacing bar adapted to extend substantially horizontally, said bar carrying at one end means for communicatingly connecting one of the service pipes with one of the meter pipes and said bar having in its other end an integral socket bearing extending transversely therethrough, said socket contracted at its lower end to form a stop, a sleeve member to fit in said bearing and against said stop, said sleeve member provided at its upper end with means whereby it may be connected independently of said bar to the end of the other service pipe, said sleeve contracted at its lower end to directly receive and engage said socket bearing by shifting the bar upward toward the service pipe and onto the sleeve thereon, and means engaging the bar and sleeve for holding said bar firmly connected with said sleeve.

5. In a meter connection, the combination of a rigid one-piece service pipe spacing bar adapted to extend substantially horizontally, said bar carrying at one end means for communicatingly connecting one of the service pipes with one of the meter pipes and said bar having in its other end an integral socket bearing extending transversely through the bar said socket contracted at its lower end to form a stop, a sleeve member to fit in said bearing and against said stop, said sleeve member provided at its upper end with means whereby it may be connected independently of said bar to the end of the other service pipe, said sleeve member constructed at its lower end to directly receive and engage said socket bearing by shifting the bar upwardly toward the service pipe and onto the sleeve thereon and threaded means engaging the bar and contacting with the upper portion of the sleeve to draw the bar tightly onto the sleeve.

CHARLES W. STEVENS.